United States Patent [19]
Wölfges

[11] Patent Number: 4,548,383
[45] Date of Patent: Oct. 22, 1985

[54] ELECTRICALLY CONTROLLED PRESSURE REDUCING VALVE

[75] Inventor: Hans Wölfges, Lohr, Fed. Rep. of Germany

[73] Assignee: Mannesmann Rexroth GmbH, Fed. Rep. of Germany

[21] Appl. No.: 582,741

[22] Filed: Feb. 23, 1984

[30] Foreign Application Priority Data

Mar. 3, 1983 [DE] Fed. Rep. of Germany ....... 3307554

[51] Int. Cl.$^4$ ............................................. F16K 31/02
[52] U.S. Cl. ........................ 251/129; 29/157.1 R; 137/315; 137/625.68; 251/325; 251/363
[58] Field of Search ................. 251/325, 84, 131, 141, 251/36, 44, 324, 362, 363, 129; 137/315, 454.6, 625.65, 625.68, 625.69; 29/509, 511, 513, 157.1 R

[56] References Cited

U.S. PATENT DOCUMENTS

| | | | |
|---|---|---|---|
| 2,037,540 | 4/1936 | Rohlin et al. ........................ | 251/36 |
| 2,645,450 | 7/1953 | Chessman ........................... | 251/325 |
| 2,877,795 | 3/1959 | Cocklin ............................... | 251/141 |
| 2,934,315 | 4/1960 | Kenann ............................... | 251/362 |
| 3,749,355 | 7/1973 | Paul .................................... | 137/454.6 |

FOREIGN PATENT DOCUMENTS

| | | | |
|---|---|---|---|
| 636481 | 3/1962 | Italy ..................................... | 251/131 |
| 554482 | 7/1943 | United Kingdom .................. | 251/44 |

*Primary Examiner*—Samuel Scott
*Assistant Examiner*—Noah Kamen
*Attorney, Agent, or Firm*—Harness, Dickey & Pierce

[57] ABSTRACT

A pressure-reducing valve is secured to a proportional magnet by resiliently connecting the valve sleeve of the valve receiving the piston to the housing of the proportional magnet, thus avoiding possible deformations of the valve sleeve resulting from mounting. Furthermore, the operational safety of the valve is improved by abutments limiting the stroke of the valve piston and by a control edge which is additionally provided at the valve sleeve.

5 Claims, 4 Drawing Figures

ELECTRICALLY CONTROLLED PRESSURE REDUCING VALVE

BACKGROUND OF THE INVENTION

Pressure-reducing valves of the type referred to are known to control the output pressure to be held constant independent of the input pressure in case the input pressure exceeds the pressure value which is controlled by the proportional magnet.

The valve housing includes a bore which is open towards the proportional magnet. This bore houses a valve sleeve including a piston. The valve housing including the valve sleeve is connected to the magnet housing by a plurality of screws which extend through axial bores in the housing of the proportional magnet and are screwed in threaded bores in the valve housing. Any dimensional tolerances of the angular alignment between the bore in the valve housing and the magnet mounting face of the valve housing as well as between the valve sleeve and the mounting face of the proportional magnet housing result in jamming the piston within the valve sleeve when the screws to press the proportional magnet to the valve housing are tightened.

SUMMARY OF THE INVENTION

Accordingly, it is an object of the present invention to provide a pressure-reducing valve which avoids the disadvantages of known valves of this type. In particular, it is an object of the present invention to provide an improved mounting of the valve and to provide a valve which has a more reliable operation.

According to the present invention the valve sleeve and the piston of the pressure-reducing valve are connected to the magnet housing such that after bringing the magnet housing and the valve housing together and tightening the connecting screws, the valve sleeve including the piston is aligned with respect to the magnet housing due to the bordered flanges which yield accordingly when the valve bore and the magnet mounting face as well as the valve sleeve and the valve mounting face are slightly angularly mismatched. This safely prevents a deformation of the valve sleeve when both housings are pressed together.

According to a further aspect of the present invention, the bore of the valve sleeve together with the magnet housing may define an abutment for the valve piston such that the abutments limit the piston stroke when the pressure rapidly changes and when high forces act on the piston, thus relieving the spring from high loads. Apparently this feature increases the reliability in operation of the valve.

While the outer periphery of the valve piston conventionally includes an annular groove which defines a control edge for the passage of fluid in the port which is connected to an input pressure source, according to a still further aspect of the present invention the control edge is defined by a recess in the valve sleeve. Accordingly, the cross-section between the inner bore and the outer diameter of the valve piston is not weakened which is particularly of advantage for pistons having a small diameter, thus increasing the safety in operation and life-time.

BRIEF DESCRIPTION OF THE DRAWINGS

The specific embodiments of the invention which are described in detail below are set forth by way of example only and should not be construed as to limit the scope of the invention which is defined in the appended claims.

In the attached drawings.

DESCRIPTION

Figure 1:
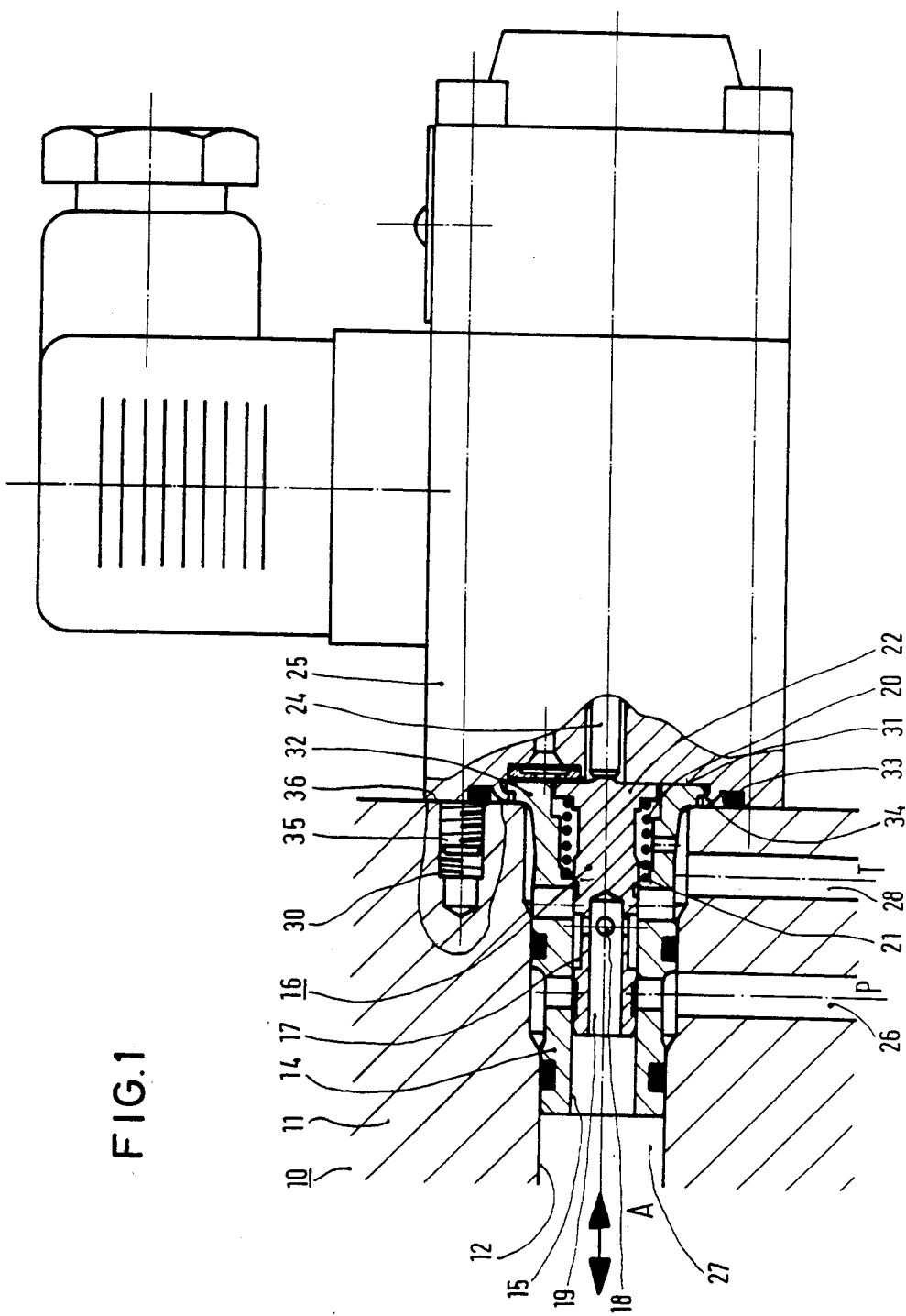
FIG. 1 is an axial section showing a first embodiment of a pressure-reducing valve and FIG. 2 is an axial section of a second embodiment of a pressure-reducing valve, wherein similar components are identified by similar reference numerals.

The pressure-reducing valve 10 comprises a valve housing 11 including a bore 12 in which a valve sleeve 14 is provided, said valve sleeve including a bore 15 in which a piston 16 is slidably provided. According to FIG. 1 the piston 16 is provided with an annular groove 17 which is in communication through a plurality of radial bores 18 with an axial central bore 19.

A spring 20 which is provided between a shoulder 21 of the valve sleeve and the end of the piston 16 defining a spring retainer 22 urges the piston 16 against the armature pin 24 of a proportional magnet of which the housing 25 is shown.

The desired output pressure of the valve is controlled by the proportional magnet which armature pin 24 accordingly displaces the piston 16 against the force of the spring 20 to a position in which the valve is open and pressure fluid from a passage 26 which is connected to an input pressure source passes via the annular groove and the bores 18 and 19 to a passage 27 in which the output pressure prevails. When the output pressure acting on the piston 16 reaches the desired value, the piston 16 is displaced to restrict the passage of fluid from passage 26 to passage 27. When the output pressure in the passage 27 increases to a value which is higher than the pressure predetermined by the proportional magnet, the piston 16 is further displaced until the annular groove 17 closes the passage 26 and connects the passage 27 to the passage 28, thus relieving the pressure to the reservoir.

The valve housing 11 and the magnet housing 25 are connected to each other by screws 35 of which only one is illustrated, which screws 35 extends through axial bores in the magnet housing 25 and are screwed with threaded bores 30 in the valve housing 11.

Figure 3:
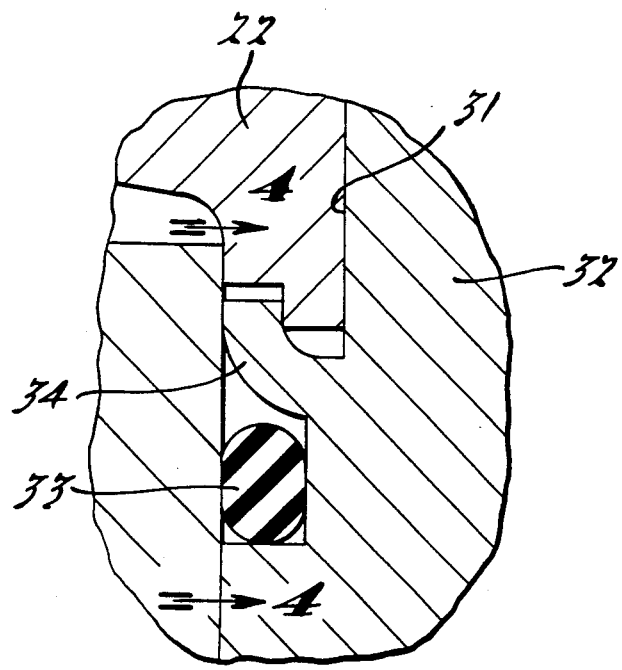
FIG. 3 is an enlarged cross-sectional view showing the configuration for retaining the valve sleeve within the housing.
Figure 4:
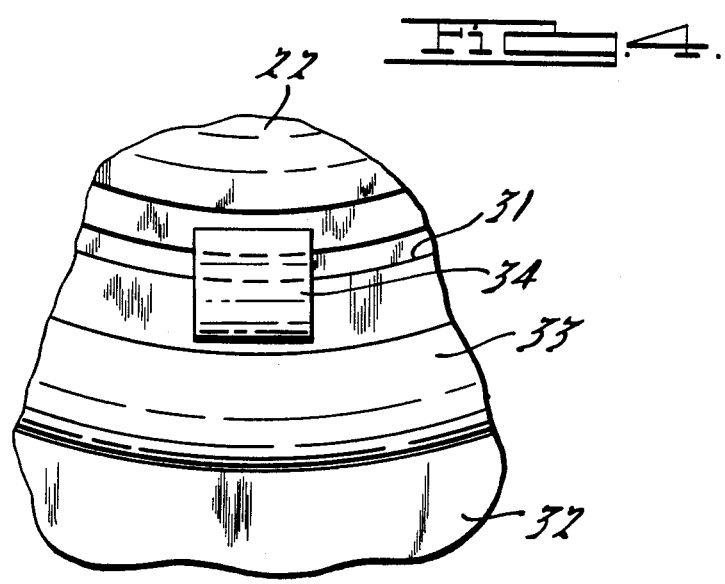
FIG. 4 is an elevational view looking in the direction of the arrow 4 in FIG. 3.

The front face of the housing 25 of the proportional magnet is provided with a circular recess 31. Regarding its largest diameter the flange 32 has a radial play with respect to the recess 31. Alike, the recess 31 is deeper than the thickness of the flange 32 which thus has an axial play within the recess. An annular groove 33 receiving a sealing ring is provided radially outwardly of the recess 31. The web which is defined between the annular groove 33 and the recess 31 is depressed or, respectively, flanged towards and over the flange 32 at a number of spots along the periphery. In FIGS. 1, 3 and 4 the flanged spots bear the reference numeral 34. Accordingly the valve sleeve 14 including the piston 16 and the spring 20 is connected to the magnet housing 25.

When the mounting unit comprising the valve sleeve 14, the piston 16, the spring 20 and the proportional magnet are connected to the valve housing by means of screws 35, the flanged spots 34 may yield such that the position of the valve sleeve 14 with respect to the magnet housing is adjusted, thus compensating for angular deviations in the valve housing 11 between the valve bore 12 and the magnet mounting face 36 as well as between the valve sleeve 14 and the magnet housing 25. The number of the spot-like depressions 34 and thus the stability of the connection is selected such that the flanged spots yield before the valve sleeve 14 is dislocated or, respectively, deformed. Jamming of the piston 16 in the valve sleeve is thus safely avoided as the valve sleeve may be aligned in any position as required.

Figure 2:
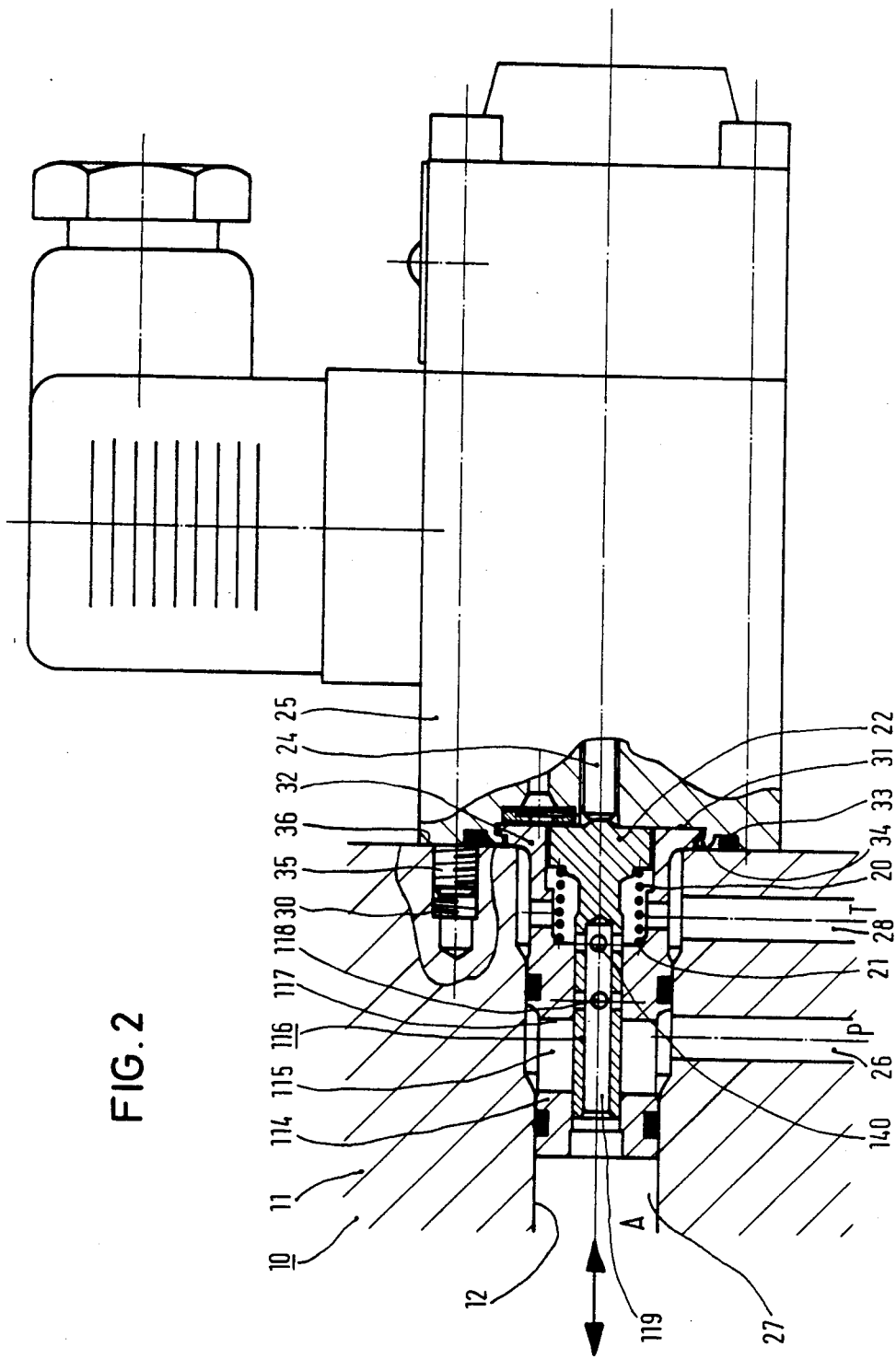

According to the embodiment of FIG. 2 the piston 116 does not carry an annular groove, the valve sleeve 114 rather including a recess 115 which has a rectangular cross-section of which the dimension normal to the piston axis is larger than the piston diameter. This defines a control edge 117 which co-operates with the radial bores 118 in the piston which bores open into the axial bore 119. The bore 119 communicates through radial bores 140 with the passage 28 connected to the reservoir. All other components are of identical structure as shown in FIG. 1 thus identical reference numerals are used.

The embodiment of FIG. 2 avoids to weaken the cross-section of the piston by the annular groove 17 of piston 16 in FIG. 1. This is of particular advantage when the diameter of the piston is relatively small. The piston diameter is determined by the value of the output pressure. Accordingly the pressure-reducing valve of FIG. 2 is particularly suited for high output pressure.

The rectangular shape of the recess 115 results in a straight control edge 117 normal to the piston axis. Accordingly the overlap of the control edges 117 and the radial bores 118 remains unchanged when the piston rotates.

Having fully expounded the objects, advantages and novel features of the invention, we claim:

1. An electrically controlled pressure-reducing valve comprising a valve housing, a valve bore in said housing, a valve sleeve in said bore, a piston slidably arranged in a bore of said valve sleeve, and a proportional magnet having a housing connected to said valve housing by a plurality of screws with said magnet housing and said valve housing having abutting faces, the proportional magnet including an armature pin contacting said piston for moving said piston, said proportional magnet controlling the desired output pressure through cooperation of said piston with said valve sleeve, characterized in said valve sleeve having an annular flange received with play within a circular recess formed at least in said abutting face of said magnet housing, said annular flange being loosely fixed within said circular recess prior to assembly of said valve housing and said magnet housing by flared portions means of an edge of the housing defining said recess for movement of said valve sleeve relative to said circular recess for locating of said valve sleeve within said valve bore to compensate for irregularities in the alignment of said abutting faces upon assembly.

2. Pressure-reducing valve as defined in claim 1, wherein said flared portions means comprises a web-like portion along the edge defining the circular recess said web-like portion being spot flared at a plurality of locations circumferentially spaced from each other.

3. Pressure-reducing valve as defined in claim 1, wherein one end of the piston is substantially flush and one end of the valve sleeve is formd with a counter bore for receiving a spring and wherein a shoulder in the inner end of the counter bore of the valve sleeve as well as the bottom of the circular recess and a flange on said one end of said piston define abutments for the spring.

4. Pressure-reducing valve as defined in claim 1, wherein the piston includes a central axis bore and at least a radial bore, said central bore communicating with an output pressure passage and said radial bore communicates selectively with an input pressure passage with a reservoir and wherein a control edge for the communication between said input pressure passage and said radial bore is defined by a rectangular recess in said valve sleeve and wherein communication of the axial bore and reservoir as provided by a second radial bore in said piston.

5. Pressure-reducing valve as defined in claim 4, wherein the control edge of the rectangular recess is broader than the diameter of the piston.

* * * * *

UNITED STATES PATENT AND TRADEMARK OFFICE
CERTIFICATE OF CORRECTION

PATENT NO. : 4,548,383
DATED : October 22, 1985
INVENTOR(S) : Hans Wolfges

It is certified that error appears in the above-identified patent and that said Letters Patent is hereby corrected as shown below:

Column 4, line 30, (Claim 4, line 2), "axis" should be --axial--.

Signed and Sealed this

Twenty-second Day of April 1986

[SEAL]

Attest:

DONALD J. QUIGG

Attesting Officer
Commissioner of Patents and Trademarks